US008534686B1

(12) United States Patent
Slawson

(10) Patent No.: US 8,534,686 B1
(45) Date of Patent: Sep. 17, 2013

(54) INDEPENDENT STRUT SUSPENSION

(75) Inventor: James Slawson, Spirit Lake, IA (US)

(73) Assignee: AGCO Corporation, Duluth, GA (US)

( * ) Notice: Subject to any disclaimer, the term of this patent is extended or adjusted under 35 U.S.C. 154(b) by 441 days.

(21) Appl. No.: 12/981,880

(22) Filed: Dec. 30, 2010

(51) Int. Cl.
B60G 15/00 (2006.01)
B60G 13/00 (2006.01)
F16F 7/00 (2006.01)
F16F 9/00 (2006.01)

(52) U.S. Cl.
USPC ...... 280/124.145; 280/124.146; 280/124.147; 280/124.154; 280/124.155; 267/225

(58) Field of Classification Search
USPC .............. 280/124.145, 124.146, 124.147, 280/124.154, 124.155; 267/222, 223, 224, 267/225
See application file for complete search history.

(56) References Cited

U.S. PATENT DOCUMENTS

| 5,597,172 | A * | 1/1997 | Maiwald et al. ....... 280/124.153 |
| 6,371,237 | B1 * | 4/2002 | Schaffer ........................ 180/253 |
| 6,491,306 | B2 * | 12/2002 | Schaffer ..................... 280/5.502 |
| 7,168,717 | B2 * | 1/2007 | Wubben et al. ........ 280/124.127 |
| 7,669,675 | B2 * | 3/2010 | Hagie .............................. 180/24 |
| 2006/0170176 | A1 | 8/2006 | Wubben et al. |
| 2006/0283653 | A1 | 12/2006 | Buschena |
| 2009/0224501 | A1 | 9/2009 | Carlson et al. |
| 2010/0044980 | A1 | 2/2010 | Kremmin et al. |
| 2010/0044989 | A1 | 2/2010 | Steffensen et al. |

FOREIGN PATENT DOCUMENTS

| WO | WO 2009/127278 A1 | 10/2009 |
| WO | WO 2010/020605 A1 | 2/2010 |
| WO | WO 2010/020607 A1 | 2/2010 |
| WO | WO 2010/020608 A1 | 2/2010 |

* cited by examiner

Primary Examiner — Joseph Rocca
Assistant Examiner — Joselynn Y Sliteris

(57) ABSTRACT

A suspension system may be provided. The suspension system may comprise a wheel support idler and a strut. A top end of the strut may be attached to a bottom of the wheel support idler. The suspension system may further comprise a spring configured to absorb shock from the strut. A bottom of the spring may be attached to a top of the wheel support idler. The suspension system may further comprise a first tower and a second tower. The wheel support idler may be configured to slide up and down on the second tower and the wheel support idler may not contact the first tower.

18 Claims, 3 Drawing Sheets

INDEPENDENT STRUT SUSPENSION

BACKGROUND

A tractor is a vehicle designed to deliver a high torque at slow speeds for hauling a trailer or machinery used in agriculture or construction. "Tractor" is most commonly used to describe a farm vehicle. Agricultural implements may be towed behind or mounted on the tractor, and the tractor may also provide a source of power if the implement is mechanized.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A suspension system may be provided. The suspension system may comprise a wheel support idler and a strut. A top end of the strut may be attached to a bottom of the wheel support idler. The suspension system may further comprise a spring configured to absorb shock from the strut. A bottom of the spring may be attached to a top of the wheel support idler. The suspension system may further comprise a first tower and a second tower. The wheel support idler may be configured to slide up and down on the second tower and the wheel support idler may not contact the first tower.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
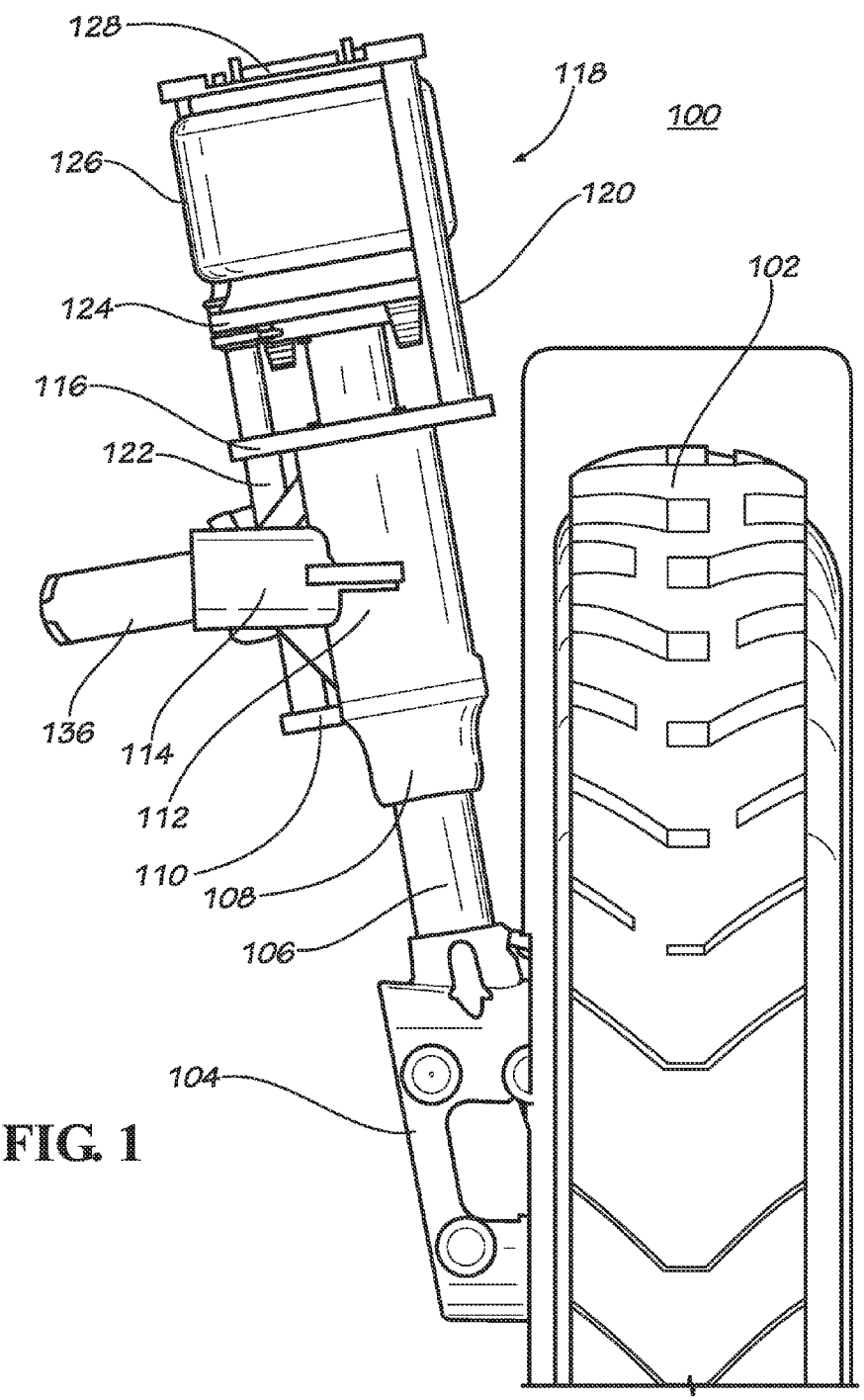
FIG. 1 shows an independent strut suspension system.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Consistent with embodiments of the invention, an independent strut suspension system may be provided. Embodiments of the invention may allow independent vertical motion of all four wheels of a vehicle such as an agricultural vehicle (e.g. a tractor.) Conventional suspensions require too much real estate above an axle vertically and may be taller than embodiments of the invention. Embodiments of the invention may be more compact than conventional systems, allowing space for other components, for example, a front entrance for an agricultural sprayer. With embodiments of the invention, the front-end of an agricultural sprayer may achieve a maximum width. In addition, embodiments of the invention may provide independent ride and zero bump steer.

With embodiments of the invention, a main axle housing may have two towers. A strut for suspension may slide up and down in the main axle housing. One tower may extend lower on the side of the main axle housing than the other tower. This lower extending tower may be used for steering kinematics providing steering to the strut.

FIG. 1 shows an independent strut suspension system 100. As shown in FIG. 1, system 100 may comprise a wheel 102 that may be connected to a wheel box 104. Wheel box 104 may be connected to a bottom end of a strut 106 that may slide axially in system 100 and specifically in a journal 108. Journal 108 may have a journal lip 110 at an upper end of journal 108. Journal lip 110 may be connected to an axle housing 112. An axle 114 may be connected to axle housing 112. Axle 114, for example, may be connected to an agricultural vehicle. Axle housing 112 may have an axle housing cap 116 connected to the top of axle housing 112. Consistent with embodiments of the invention, several elements may be cast into one piece. For example, any two or more of journal 108, journal lip 110, axle housing 112, axle 114, and axle housing cap 116 may be cast as one piece.

Independent suspension system 100 may further comprise a spring unit 118. Spring unit 118 may comprise a first tower 120 and a second tower 122. A wheel support idler 124 may be connected to a top end of strut 106. A spring 126 may be disposed between wheel support idler 124 and a spring plate 128. Spring 126 may be attached to wheel support idler 124. Spring 126 may comprise any device capable of carrying capacity (e.g. weight of an agricultural vehicle) and absorbing shock and is not limited to a mechanical spring. Spring 126 may comprise, but is not limited to, an air bag, a hydraulic spring, an electro-magnetic spring, or a mechanical spring, for example.

Spring plate 128 may be attached to a top end of first tower 120 and to a top end of second tower 122. First tower 120 may connect to axle housing cap 116 and be disposed between spring plate 128 and axle housing cap 116. Second tower 122 may connect to journal lip 110 and be disposed between spring plate 128 and journal lip 110. Consistent with embodiments of the invention, first tower 120 may be shorter than second tower 122 because first tower 120 may not extend all the way down to journal lip 110. Consequently, wheel 102 may be afforded more room because first tower 120 may stop at a level above wheel 102. Accordingly, embodiments of the invention may provide a more compact system over conventional systems.

Figure 2:
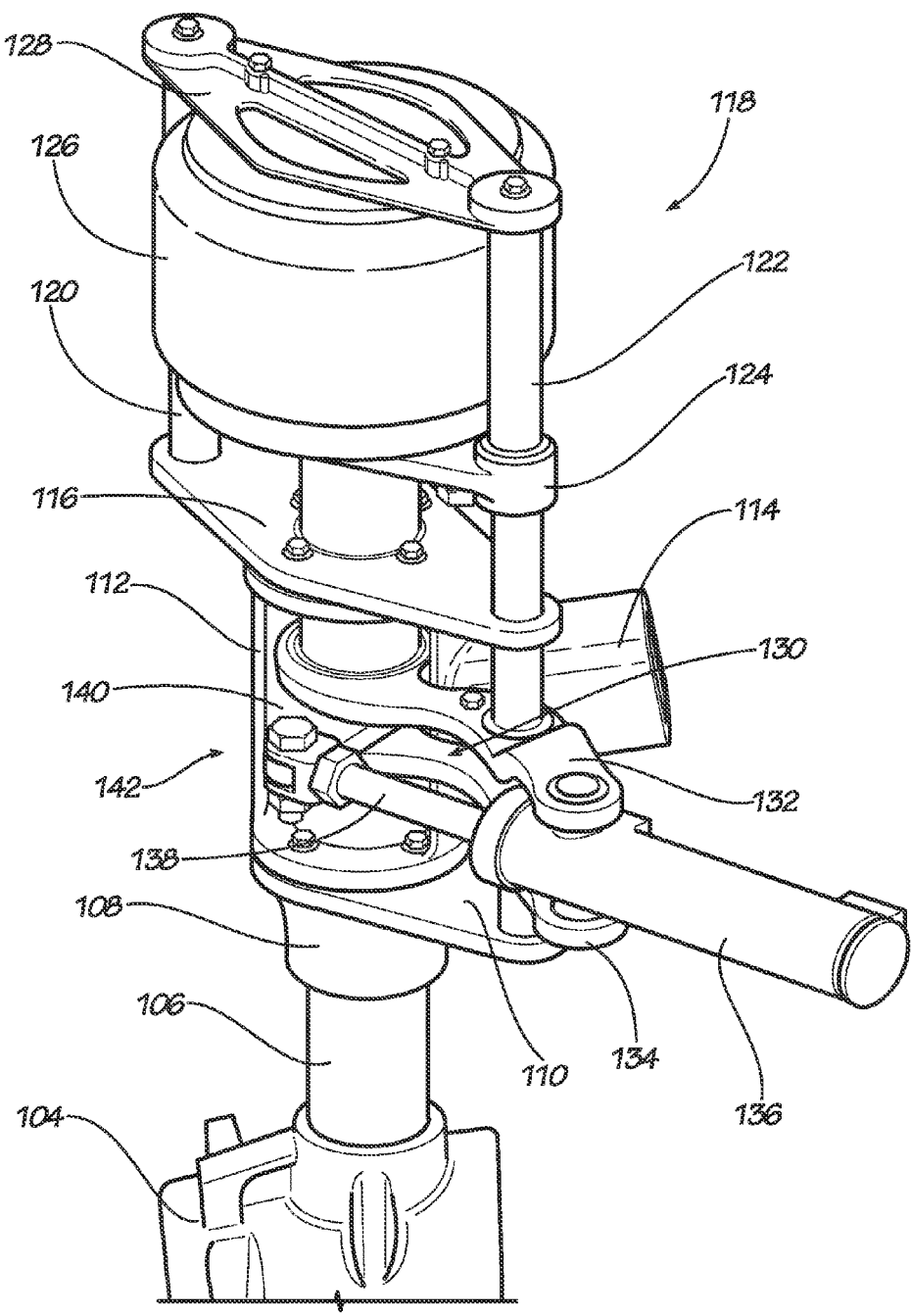
FIG. 2 shows an independent strut suspension system.
Figure 3A:
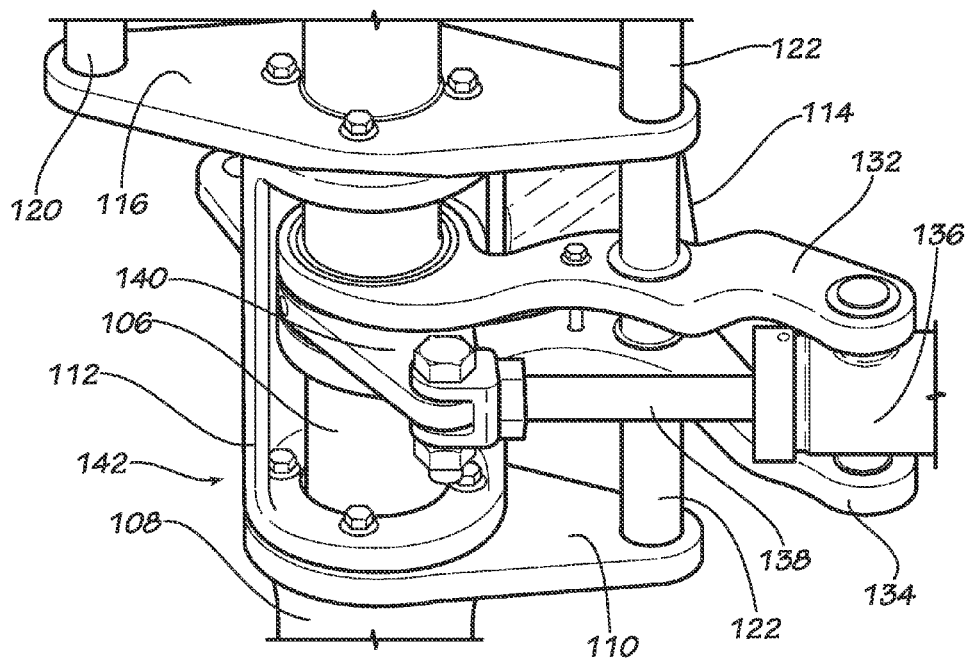
FIGS. 3A and 3B show an independent strut suspension system.
Figure 3B:
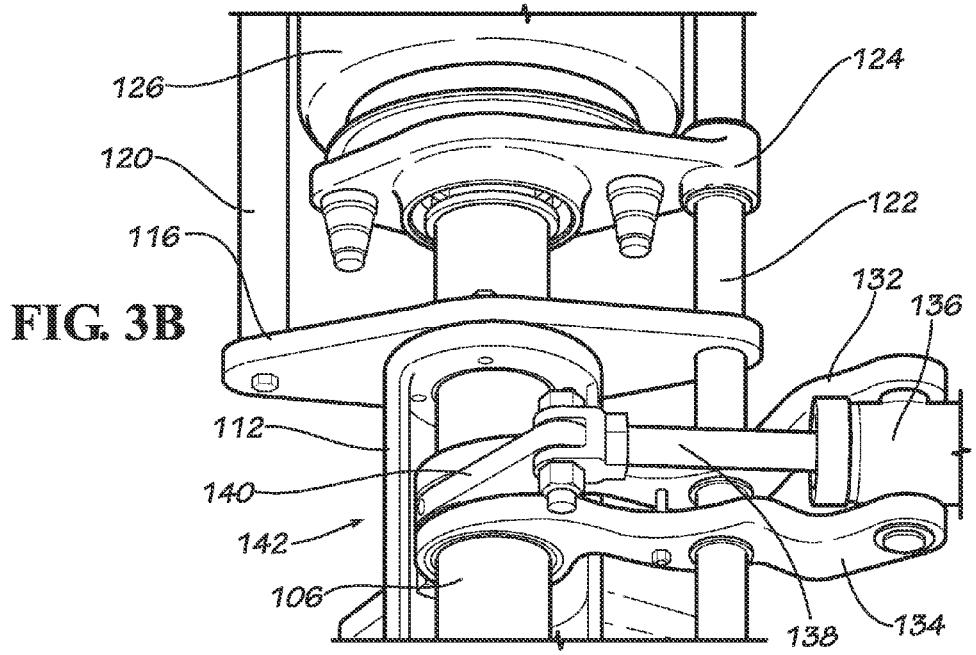

FIG. 2 shows another view of independent strut suspension system 100. As shown in FIG. 2, a steering idler arm 130 may be disposed between second tower 122 and strut 106. Steering idler arm 130 may comprise a steering idler arm upper portion 132 and a steering idler arm lower portion 134. A piston 136 may be disposed on steering idler arm 130, for example, between steering idler arm upper portion 132 and steering idler arm lower portion 134. Piston 136 may comprise a rod 138 connected to a steering arm 140. Steering arm 140 may be connected to strut 106. Steering idler arm 130 may connect to strut 106 through an opening 142 in axle housing 112. FIGS. 3A and 3B show more detailed views of independent strut suspension system 100. In other embodiments, piston 136 may be attached to steering arm 140 with rod 138 attached to steering idler arm 130.

Consistent with embodiments of the invention, independent strut suspension system 100 may be used in conjunction with an agricultural vehicle. Consequently, as wheel 102 traverses uneven or rough ground, mechanical shock from this traversal may be absorbed by spring 126. Up and down motion from wheel 102 may be transferred to wheel box 104 and to strut 106. Accordingly, as wheel 102 traverses uneven or rough ground, strut 106 may slide up and down in journal 108. Because the top end of strut may be connect to wheel support idler 124 that may support a bottom of spring 126, spring 126 may compress and decompress in communication with wheel support idler 124 connect to strut 106 as strut 106 slides up and down in journal 108. In this way, shock from wheel 102 may be transferred through strut 106 and ultimately absorbed by spring 126.

As illustrated in FIG. 3B, wheel support idler 124 may connect to second tower 122. Wheel support idler 124 may not connect to first tower 120. When moving in communication with the top end of strut 106, wheel support idler 124 may slide axially up and down on second tower 122.

In order to apply a steering force on wheel 102, strut 106 may rotate in system 100 and specifically in journal 108. The steering force may be applied by piston 136. For example, when a hydraulic fluid is expanded and contracted in piston 136, rod 138 may be correspondingly extended and retracted. Because steering arm 140 may be attached to both rod 138 and to strut 106, the extension and retraction of rod 138 may rotate strut 106 in journal 108 thus transferring the steering force from piston 136 to wheel 102. In other words, steering arm 140 may be connected to strut 106 such that steering arm 140 may rotate with and move up and down with strut 106.

Because steering arm 140 may be attached to strut 106, steering arm 140 may move up and down in conjunction with the movement of strut 106. Moreover, because steering arm 140 is between steering idler arm upper portion 132 and steering idler arm lower portion 134, steering idler arm 130 may move up and down in conjunction with steering arm 140. Consistent with embodiments of the invention, steering idler arm 130 (and thus piston 136) may be configured to slide up and down second tower 122 congruent with corresponding up and down movements of steering arm 140. Steering idler arm 130 may be configured to allow strut 106 to rotate within steering idler arm 130 where steering idler arm 130 and strut 106 connect.

While certain embodiments of the invention have been described, other embodiments may exist. Further, any disclosed methods' stages may be modified in any manner, including by reordering stages and/or inserting or deleting stages, without departing from the invention. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A suspension system comprising:
   a wheel support idler;
   a strut, wherein a top end of the strut is attached to a bottom of the wheel support idler;
   a spring configured to absorb shock from the strut, wherein a bottom of the spring is attached to a top of the wheel support idler;
   a first tower; and
   a second tower, wherein the wheel support idler is configured to slide up and down on the second tower and the wheel support idler does not contact the first tower.

2. The suspension system of claim 1, further comprising a spring plate wherein a top of the spring is in contact with the spring plate and wherein the spring plate is attached to a top of the first tower and wherein the spring plate is attached to a top of the second tower.

3. The suspension system of claim 2, further comprising an axle housing cap below the wheel support idler wherein the first tower extends upwardly from axle housing cap to the spring plate.

4. The suspension system of claim 2, further comprising an axle housing cap below the wheel support idler wherein the second tower extends through axle housing cap and upwardly from axle housing cap to the spring plate.

5. The suspension system of claim 4, further comprising an axle housing attached below the axle housing cap.

6. The suspension system of claim 5, wherein the axle housing is attached to an axle of an agricultural vehicle.

7. The suspension system of claim 5, further comprising a journal having a journal lip, the journal being attached to a bottom of the axle housing, the strut configured to slide axially in the journal.

8. The suspension system of claim 7, wherein the second tower extend upwardly from the journal lip to the spring plate.

9. The suspension system of claim 1, further comprising a wheel box attached to a bottom end of the strut.

10. The suspension system of claim 9, wherein the wheel box is attached to a wheel.

11. A suspension system comprising:
    an axle housing having an opening;
    a strut extending through the axle housing;
    a steering arm attached to and extending from a portion of the strut in the opening;
    a journal having a journal lip wherein the strut is configured to slide axially in the journal, a top of the journal being attached to a bottom of the axle housing;
    an axle housing cap attached to a top of the axle housing; a first tower extending from a top side of the axle housing cap; a second tower extending upwardly from the journal lip and through the axle housing cap; and
    a steering idler arm configured to slide up and down the second tower, the steering idler arm being connected to the portion of the strut in the opening, the strut being configured to rotate in the steering idler arm.

12. The suspension system of claim 11, wherein the steering idler arm comprises a steering idler arm upper portion and a steering idler arm lower portion.

13. The suspension system of claim 12, wherein the steering arm is disposed between the steering idler arm upper portion and the steering idler arm lower portion.

14. The suspension system of claim 11, further comprising a piston being attached to the steering idler arm wherein the piston further comprises a rod attached to the steering arm.

15. The suspension system of claim 11, further comprising a piston being attached to the steering arm wherein the piston further comprises a rod attached to the steering idler arm.

16. The suspension system of claim 11, further comprising an axle being attached to the axle housing.

17. The suspension system of claim 16, wherein the axle is attached to an agricultural vehicle.

18. A suspension system comprising:
    an axle housing having an opening;
    a strut extending through the axle housing;

a steering arm attached to and extending from a portion of the strut in the opening;

a journal having a journal lip wherein the strut is configured to slide axially in the journal, a top of the journal being attached to a bottom of the axle housing;

an axle housing cap attached to a top of the axle housing; a first tower extending upwardly from the axle housing cap; a second tower extending upwardly from the journal lip and through the axle housing cap;

a steering idler arm configured to slide up and down the second tower, the steering idler arm being connected to the portion of the strut in the opening, the strut being configured to rotate in the steering idler arm;

a wheel support idler disposed above the axle housing cap, wherein a top end of the strut is attached to a bottom of the wheel support idler wherein the wheel support idler is configured to slide up and down on the second tower and the wheel support idler does not contact the first tower;

a spring configured to absorb shock from the strut, wherein a bottom of the spring is attached to a top of the wheel support idler; and a spring plate wherein a top of the spring is in contact with the spring plate and wherein the spring plate is attached to a top of the first tower and wherein the spring plate is attached to a top of the second tower.

* * * * *